Feb. 15, 1966    W. J. GOODRICH    3,235,143
DISPENSING CONTAINER
Filed March 10, 1965    2 Sheets-Sheet 1
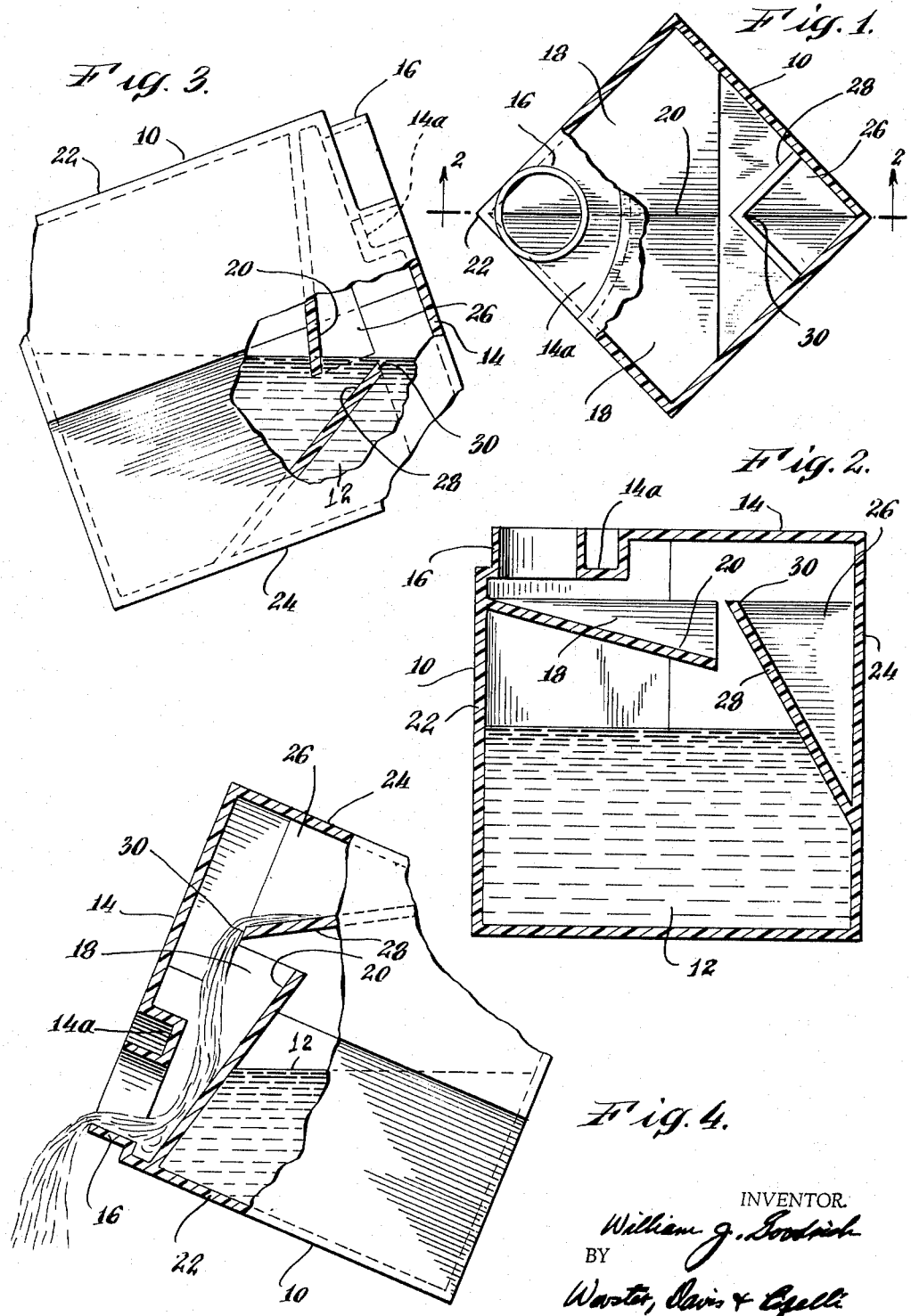
INVENTOR.
William J. Goodrich
BY
Wooster, Davis & Cifelli
ATTORNEYS.

Feb. 15, 1966 W. J. GOODRICH 3,235,143
DISPENSING CONTAINER
Filed March 10, 1965 2 Sheets-Sheet 2
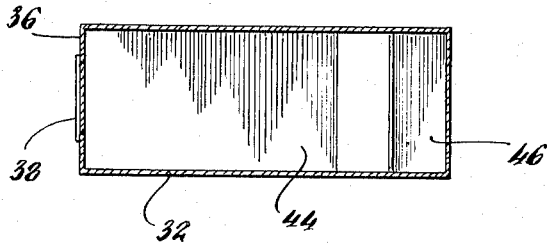
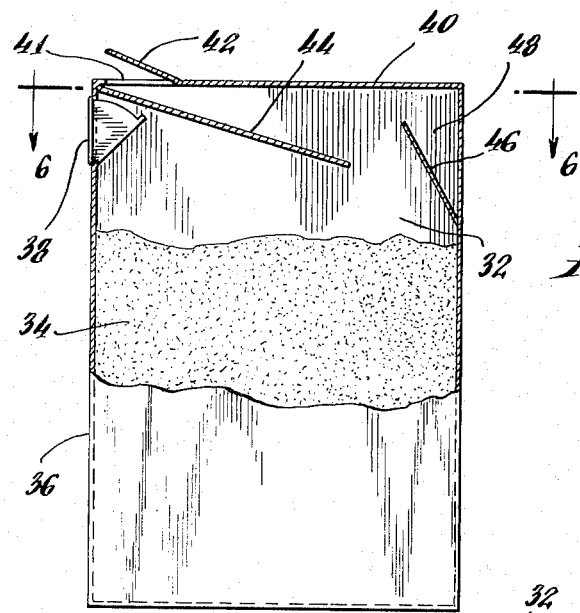
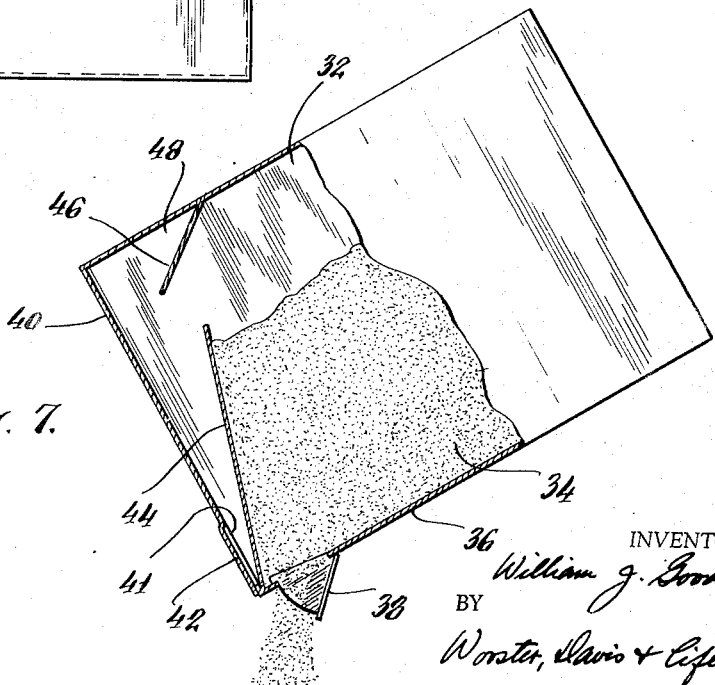
INVENTOR.
William J. Goodrich
BY
Worster, Davis & Cifelli
ATTORNEYS.

United States Patent Office 3,235,143
Patented Feb. 15, 1966

3,235,143
DISPENSING CONTAINER
William J. Goodrich, Fairfield, Conn., assignor of forty-nine percent to Robert P. Panish, Fairfield, Conn.
Filed Mar. 10, 1965, Ser. No. 438,528
10 Claims. (Cl. 222—454)

This invention relates to a dispensing container for dispensing measured amounts of a material.

Many attempts have been made in the prior art to provide a container which automatically dispenses a material in measured amounts. However, containers which have been heretofore proposed include a number of deficiencies. One of these deficiencies is that containers of this type are often limited to use with either a particulate solid material or with a liquid and are seldom suitable for use with both particulate solids and liquids. A second disadvantage is that the measurement is often quite inaccurate. In one type of dispenser, for example, the container is inverted and the powdered material passes through a measuring orifice into a separate chamber. The dispenser is then returned to its upright position and the measured material is dispensed from the chamber. The difficulty with an arrangement of this type is that the quantity of material which passes through the orifice depends upon the physical characteristics of the material employed. For example, a powdered material, such as baking soda, and a granular material, such as sugar, would be dispensed by different amounts. Furthermore, dispensers of this type are completely unusable for free-flowing materials such as liquids. Another disadvantage of prior art dispensers is that they often require complete inversion in order to separate the measured quantity of material from the bulk of the material contained.

Accordingly, it is the primary object of the present invention to provide an improved measuring and dispensing container. Other objects are to provide such a container which provides positive measurement; which may be utilized for containing and measuring either powder or liquid; wherein the same amount of material is dispensed regardless of the physical characteristics of the material; and which does not require complete inversion of the container.

The manner in which the foregoing objects are achieved will be more apparent from the following description, the appended claims and the figures of the attached drawings wherein:

FIG. 1 is a top view, partially broken away, of a dispensing container in accordance with this invention;

FIG. 2 is a cross section taken along the line 2—2 of FIG. 1;

FIG. 3 illustrates a first step in dispensing a measured amount;

FIG. 4 illustrates a measured amount being dispensed;

FIG. 5 is a cross sectional view of a modified form of the invention;

FIG. 6 is a cross section taken along the line 6—6 of FIG. 5; and

FIG. 7 is an illustration showing one mode of operation of the modification of FIG. 5.

With particular reference to FIGS. 1 and 2, there is illustrated a container 10 for measuring and dispensing a liquid 12, such as a medicine, in controlled amounts. The container is formed from a suitable liquid tight material such as a wax or plastic coated paper, plastic, glass, etc. If the container is used to dispense powdered materials, it may be formed of any other suitable material, such as uncoated cardboard. In the illustrated embodiment, the container 10 is of rectangular cross section and includes a top wall 14 having a depressed portion 14a at one corner. A spout 16 extends upwardly from the depressed portion 14a to define a dispensing opening.

Mounted within the container 10 is a shelf member 18. The shelf member is V-shaped in cross section, the apex 20 of the V extending downwardly into the container from the corner adjacent the spout 16. The shelf member 18 extends completely across the width of the container as shown in FIG. 1 but terminates short of back corner 24. Positioned within the space between the edge of shelf member 18 and the back corner 24 is a measuring compartment 26. The measuring compartment 26 is formed between a V-shaped partition 28 and the back corner 24. The upper end of the apex of the V forms a pouring lip 30 which is positioned above the lower end of the apex 20 of shelf member 18.

The measuring compartment 26 may be formed in any convenient size, depending upon the use for which it is intended. For example, in the illustrated embodiment, where liquid medicine is being dispensed, it may be of one teaspoon or one tablespoon size.

The operation of the dispensing container of the invention may be best understood by reference to FIGS. 3 and 4. To measure and dispense the contents of the container, it is merely necessary to tip the container first backward and then forward. When the container is tipped backwardly, as illustrated in FIG. 3, it will be seen that the measuring compartment 26 formed by the partition 28 is submerged beneath the liquid 12. Upon returning the container to its normal upright position the measuring compartment 26 will be filled with the liquid being measured. The main body of liquid, however, will return to the state illustrated in FIG. 2. To dispense the measured quantity, the container is merely tipped forward in the manner shown in FIG. 4. In this position, the measured liquid in compartment 26 flows over the pouring lip 30 and against the shelf member 18, which directs it to the spout 16. At the same time, the shelf member 18 serves as a baffle to prevent the main body of liquid 12 from reaching the spout. When returned to the upright position, the downwardly sloping shelf member 18 allows any undispensed excess to drain into the main body of liquid 12 so that a succeeding measurement is not affected.

In the embodiment just described, it will be noted that a measuring compartment of fixed size is employed to measure the liquid being dispensed. Accordingly, the volume dispensed is completely independent of the type of material being dispensed. For this reason, the illustrated container is equally suitable for dispensing powdered or granular material. Furthermore, the amount being dispensed is reproducible with a high degree of accuracy, a feature which is highly important in dispensing materials such as medicine.

In FIGS. 5, 6, and 7 there is shown a modification of this invention which is designed for either measured dispensing as previously described or unlimited dispensing. These illustrations disclose a box 32 containing a powdered materal such as soap powder 34. The box includes a front side 36 having a reclosable hinged pouring spout 38 at its upper end and a top side 40 having an opening 41 closeable by a flap 42 at its front end. Mounted within the box 32 and extending downwardly from the corner between front side 36 and top side 40 is a flat angled shelf member 44 extending across the box. Extending across the back of the box 32 is a flat angled partition 46 which forms a measuring compartment 48 with the back of the box. The upper edge of the partition 46 is above the free edge of shelf member 44 as illustrated. The operation of the box in dispensing measured amounts of powder is similar to that of the container previously described. With pouring spout 38 closed the box is tipped rearwardly to fill the measuring compartment 48, is righted, and is then tipped forwardly to dispense the measured powder from the opening 41. For dispensing unlimited amounts of powder, the flap 42 is closed and pouring spout 38 is opened. The box is then tipped forward, as shown in FIG. 7, allowing an unlimited amount of powder to be poured therefrom.

Although only two modifications of the present invention have been described herein, it will be understood by those skilled in the art that a number of other variations and modifications may be made without departing from its spirit and scope. Accordingly, it is to be understood that the foregoing description is illustrative only rather than limiting. This invention is limited only by the scope of the following claims.

What I claim as new and desire to secure by Letters Patent of the United States is:

1. A dispensing container which comprises: a hollow receptacle body defining a discharge outlet; shelf means positioned within said body to direct contained material through said outlet when said container is in a tilted dispensing position; and means forming a measuring compartment having a single opening positioned above the normal level of material within said body when in upright position to discharge material onto said shelf means and through said outlet when the container is in said dispensing position.

2. The container of claim 1 wherein said discharge outlet is positioned at the top of said body and wherein said shelf means slopes downwardly therefrom.

3. The container of claim 1 wherein said single opening is positioned above at least a portion of said shelf means.

4. A dispensing container which comprises: a hollow receptacle body defining a discharge outlet; shelf means positioned within said body below said discharge outlet and sloping downwardly therefrom, said shelf means extending across said body substantially normal to the direction of slope to prevent contained material below said shelf from passing to said outlet when said container is tipped to a dispensing position; and means forming a measuring compartment within said body, said measuring compartment having an open top defining a single opening above the lowest portion of said shelf means and positioned to be submerged beneath said material when said container is tipped away from said dispensing position and to discharge measured material onto said shelf when said container is tipped to said dispensing position.

5. The container of claim 4 wherein said body is substantially rectangular in horizontal cross section and includes a substantially rectangular top surface defining said discharge outlet in a first corner thereof.

6. The container of claim 5 wherein said shelf means is trough shaped and wherein said measuring compartment is partially defined by a vertical corner of said body substantially opposite said first corner of said top surface.

7. The container of claim 4 wherein said body is substantially rectangular in both horizontal and vertical cross section and includes a front surface, a back surface, and a substantially rectangular top surface defining said discharge outlet in a first edge thereof adjacent said front surface.

8. The container of claim 7 wherein said shelf means extends angularly downward across the interior of said body from said first edge.

9. The container of claim 8 wherein said measuring compartment is partially defined by said back surface.

10. The container of claim 8 wherein said front wall defines a pouring opening below said first edge.

References Cited by the Examiner
FOREIGN PATENTS
581,059  9/1946  Great Britain.

LOUIS J. DEMBO, *Primary Examiner.*

HADD S. LANE, *Examiner.*